United States Patent [19]

Mizuguchi et al.

[11] Patent Number: 5,890,801
[45] Date of Patent: Apr. 6, 1999

[54] KNEADING AND EXTRUDING MACHINE

[75] Inventors: Hideki Mizuguchi; Shunji Ogoshi; Nobuhisa Kobayashi; Yukio Imamura; Minoru Yoshida, all of Hiroshima, Japan

[73] Assignee: The Japan Steel Works, Ltd., Tokyo, Japan

[21] Appl. No.: 116,219

[22] Filed: Jul. 16, 1998

Related U.S. Application Data

[62] Division of Ser. No. 662,372, Jun. 12, 1996.

[30] Foreign Application Priority Data

Jun. 19, 1995 [JP] Japan ..................................... 7-151819

[51] Int. Cl.⁶ ..................................................... B28C 7/16
[52] U.S. Cl. ............................................. 366/77; 366/194
[58] Field of Search ................................ 366/77, 194, 79, 366/83, 84, 86, 85, 184, 190; 425/204, 205, 209

[56] References Cited

U.S. PATENT DOCUMENTS

| 3,723,039 | 3/1973 | Matsuoka et al. ........................ 366/85 |
| 3,817,498 | 6/1974 | Frankfurth et al. ....................... 366/84 |
| 4,310,251 | 1/1982 | Scharer et al. ........................... 366/83 |
| 4,332,481 | 6/1982 | Inoue et al. .............................. 366/84 |
| 4,542,992 | 9/1985 | Markhart ................................... 366/84 |
| 4,681,457 | 7/1987 | Orimo et al. ............................. 366/84 |
| 4,707,139 | 11/1987 | Valensky et al. ........................ 366/77 |
| 5,143,448 | 9/1992 | Ueda et al. ............................... 366/77 |
| 5,304,053 | 4/1994 | Gohishch et al. ...................... 425/205 |
| 5,310,256 | 5/1994 | Boden ...................................... 366/77 |
| 5,358,327 | 10/1994 | Derezinski et al. ..................... 366/79 |
| 5,462,426 | 10/1995 | Imamura et al. ........................ 366/77 |

FOREIGN PATENT DOCUMENTS

| 24405 | 2/1983 | Japan ...................................... 366/77 |
| 31135 | 2/1994 | Japan . |

*Primary Examiner*—Tony G. Soohoo
*Attorney, Agent, or Firm*—Sughrue, Mion, Zinn, Macpeak & Seas, PLLC

[57] ABSTRACT

An object of the present invention is to provide a kneading and extruding machine which includes a screw type two-shaft kneader and a gear pump in which the degree of kneading melted resin material can be made uniform at the discharging port of the screw type two-shaft kneader. In the kneading and extruding machine of the present invention, the height of scraping flights or inverse flights of the screw in the discharging section of the screw type two-shaft kneader is determined to be an average of the inner diameter of the cylinder and the bottom diameter of the groove of the screw at the most.

8 Claims, 6 Drawing Sheets

KNEADING AND EXTRUDING MACHINE

This is a divisional of Application Ser. No. 08/662,372 filed Jun. 12, 1996, the disclosure of which is incorporated herein by reference

BACKGROUND OF THE INVENTION

1. Field of the Invention

The present invention relates to a kneading and extruding machine which includes a screw type two-shaft kneader and a gear pump for kneading, melting and extruding resin material. More particularly, the present invention relates to improvements in a kneading and extruding machine for extruding resin material melted in a uniform condition.

2. Background

In general, large-scale kneading and extruding machines for kneading, melting and extruding resin material are used in order to increase the processing capacity and enhance the efficiency of energy to drive the machines. In each large-scale kneading and extruding machine, a screw type two-shaft kneader for kneading and melting resin and a gear pump for extruding resin are combined. Concerning the screw-type two-shaft kneader, in order to prevent the occurrence of damage to the screw and cylinder when they come into contact with each other, both end portions of the screw, that is, the drive side and the front end side of the screw are rotatably supported. Concerning the gear pump, in order to reduce the overall height, the gear pump is connected onto the side the cylinder at the end of the screw type two-shaft kneader.

Figure 8:
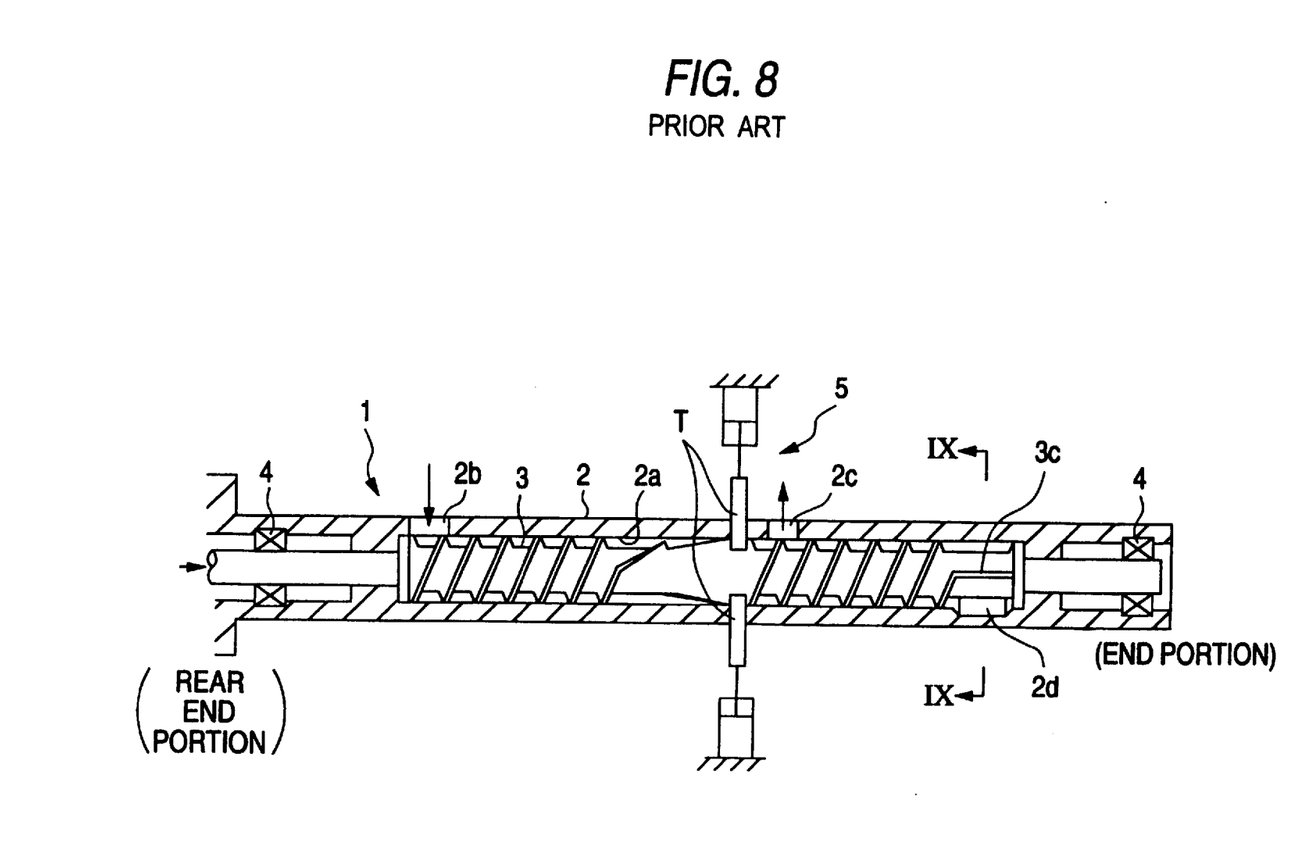
Figure 9:
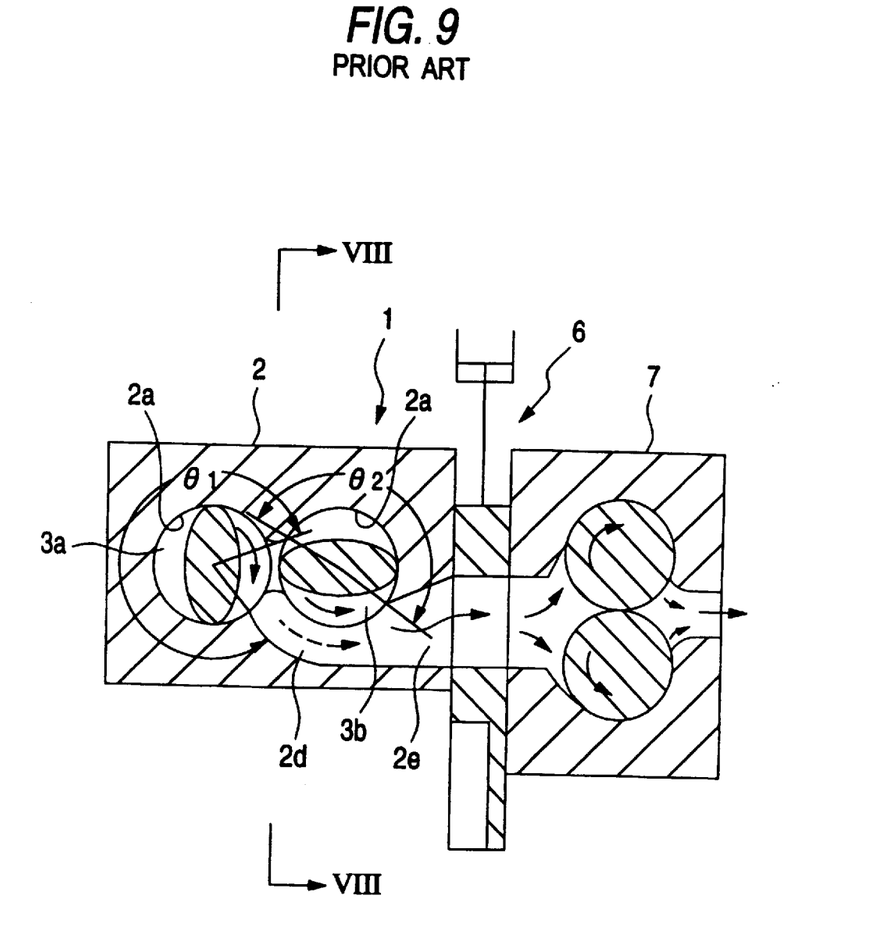
FIG. 9 is a cross-sectional view taken on line IX—IX in FIG. 8.

For example, as shown in the first drawing of Japanese Examined Patent Publication No. 6-31135, the conventional kneading and extruding machine includes the following structure. In FIGS. 8 and 9, reference numeral 1 is a screw type two-shaft kneader. The screw type two-shaft kneader 1 includes a cylinder 2 horizontally arranged, and two screws 3 rotatably inserted into an inner hole 2a formed in the cylinder 2. In the cylinder 2, there are formed a supply port 2b on an upper surface at the rear end portion of the inner hole 2a, a vent hole 2c on an upper surface of the middle portion, and a discharge port 2e arranged on one side of the end portion. The section of the inner hole 2a perpendicular to its axis is formed into two circles arranged horizontally. The two circles are adjacent and communicated with each other at the adjoining portion. At the end portion of the inner hole 2a, there is formed a discharging passage 2d from the adjoining portion to the discharge port 2e along the lower side of the inner hole 2a. The two screw shafts 3 are rotatably supported by bearings 4 arranged at the front and the rear end portion of the inner hole 2a. In the two screw shafts 3, there are provided flights by which resin material is successively conveyed, kneaded, deaerated and measured from the rear to the front end portion of the inner hole 2a. At the discharging section arranged at the front end portions of the screws 3, there are provided scraping flights 3c which are linearly arranged in the axial direction of the screws 3. In this connection, diameters of the flights of the screw 3 are the same, and in this embodiment, two series of flights are formed. In this conventional example, between the kneading section and the deaerating section, there is provided a gate type kneading degree adjusting device 5 for adjusting a clearance between the inner hole 2a of the cylinder 2 and the groove bottom of the screw 3, that is, for adjusting a sectional area of the flow passage of resin material. The discharge port 2e is connected with a gear pump 7 via a diverter valve 6.

The above kneading and extruding machine operates as follows. Resin material is supplied from the supply port 2b into the screw type two-shaft kneader 1. While the supplied resin material is being heated by a heating unit (not shown) via the cylinder 2 and melted and kneaded by the shearing action of the screw 3, the rear end portion of which is rotated by a drive unit (not shown), the resin material flows toward the discharging section. The flowing direction is changed by an angle of 90° in the discharging section. Then the resin material is discharged from the discharging port 2e to the gear pump 7 via the diverter valve 6. After that, the pressure of the resin material is increased by the gear pump 7, and the resin material is extruded from the gear pump 7. During the above operation, the degree of kneading of the resin material is adjusted by the kneading degree adjusting device 5, and volatile components and water are removed from the resin material via the vent hole 2c. The diverter valve 6 is used when the melted resin material discharged from the screw type two-shaft kneader 1 is changed over between the conveyance to the gear pump 7 and the discharge to the outside of the apparatus. In the initial stage of operation, or in the change in resin material, the resin material that contains mixtures is discharged to the outside of the apparatus by the action of the diverter valve 6.

Since the conventional kneading and extruding machine is arranged as described above, the following problems may be encountered.

In the kneading and extruding machine of the present invention, it is important to extrude melted material of a uniform degree of kneading, that is, it is important to extrude melted material of a uniform resin temperature. In the screw type two-shaft extruder, resin material is equally melted and kneaded by the two screws when the resin material is conveyed from the supply port to a position immediately before the discharging section. Therefore, the resin material flows into the discharging section under the condition that the kneading degree and the melting temperature are uniform. However, since the discharging port is formed on one side of the cylinder in the discharging section, the shapes of the inner hole of the cylinder and the discharging passage are not the same with respect to the two screws arranged on the right and left. Accordingly, the resin material conveyed by one of the screws reaches the discharging port under a different condition from that of the resin material conveyed by the other screw. Specifically, when the resin material is discharged from the discharging section while the flowing direction is changed, the resin material is subjected to a shearing action by the flights between the discharging section and the inner hole of the cylinder. In this case, the rotational angle (the action distance) of the screw 3 subjected to the shearing action is different. As shown in FIG. 9, the rotational angle of the left screw 3a subjected to the shearing action is $\theta_1$, and the rotational angle of the right screw 3b subjected to the shearing action is $\theta_2$ ($\theta_1 > \theta_2$) When the left screw 3a and the right screw 3b are rotated in a different direction, that is, when the left screw 3a is rotated clockwise and the right screw 3b is rotated counterclockwise, it is known that the resin material discharged from the left screw 3a flows on a lower layer in the discharge passage 2d, and that the resin material discharged from the right screw 3b flows on an upper layer in the discharge passage 2d. The resin material on the lower layer and the resin material on the upper layer, the viscosity of which is high in the melting condition, are seldom mixed with each other. Therefore, the resin material on the lower layer and the resin material on the upper layer flow while the layers are maintained in the previous condition.

Accordingly, on the section of the flow of resin at the discharging port, the degree of kneading, that is, the melting temperature is locally different. Even after the layers of resin have been sent to the gear pump, they are not mixed. That is, under the condition that the layers are not made to be uniform, they are extruded. Even in a granulating device (not shown in the drawing) connected with the gear pump, the above condition is not changed. As a result, pellets of different physical properties, that is, pellets, the physical values of which fluctuate greatly, are produced.

SUMMARY OF THE INVENTION

The present invention has been accomplished to solve the above problems. It is an object of the present invention to provide a kneading and extruding machine capable of obtaining melting resin, the kneading degree of which is uniform, that is, the melting temperature of which is uniform at the discharging port of a screw type two-shaft kneader.

The present invention is to provide a kneading and extruding machine including: a screw type two-shaft kneader in which two screws are rotatably inserted in parallel with each other into an inner hole of a cylinder in a horizontal condition; and a gear pump connected with a discharging port arranged on the side of a discharging section of the screw type two-shaft kneader, wherein portions of the two screw shafts corresponding to the discharging section are formed into columnar shapes having no flights.

The present invention is to provide a kneading and extruding machine including: a screw type two-shaft kneader in which two screws are rotatably inserted in parallel with each other into an inner hole of a cylinder in a horizontal condition; and a gear pump connected with a discharging port arranged on the side of a discharging section of the screw type two-shaft kneader, wherein portions of the two screw shafts corresponding to the discharging section are respectively provided with scraping flights, and the height of the scraping flights is an average of the inner diameter of one of the circles of the cylinder at the discharging section and the diameter of the groove bottom so that the flight extends further than half the distance between the groove bottom and the inner hole so that the rotating of the screws at the most flight height forms a distance no more than the average of the inner hole and the groove bottom distances.

To be in more detail, inverse flights are partially formed in respective portions at the end of the two screws corresponding to the discharging section, and the height of the inverse flights is an average of the inner diameter of one of the circles of the cylinder at the discharging section and the diameter of the groove bottom of the screws at the most.

To be in more detail, the height of the scraping flights and the height of the inverse flights of the screw distant from the discharging port are smaller than the height of the scraping flights and the height of the inverse flights of the screw close to the discharging port.

To be in more detail, the inner surface shape of the section of the cylinder at the discharging section in a direction perpendicular to the axis of the cylinder is formed into a laid U-shape which is open to the discharging port.

In the kneading and extruding machine of the present invention, the two screws in the discharging section of the screw type two-shaft kneader are formed into columnar shapes having no flights. Therefore, the melted resin material that has flowed into the discharging section is not subjected to a shearing action, and no difference is caused in the degree of kneading. Accordingly, the melted resin material flows from the two screws into the discharging section while the degree of kneading is maintained uniform. Then the resin material is discharged from the discharging port to the gear pump by the conveyance action of the two screws without being given a new shearing action, so that the degree of kneading can be maintained uniform.

Both two screws of the screw type two-shaft kneader have scraping flights at the discharging section, and the height of the flights is the same as an average value of the inner diameter of the cylinder at the discharging section and the bottom diameter of the screw groove at the most. Due to the foregoing, the shearing action of the flights is very small as compared with the shearing action caused by the flights of normal height, so that a change in the degree of kneading is negligibly small. Further, the scraping action of the flights is exhibited, and the melted resin material can be easily moved to the discharging port. For example, when the height of the scraping flights is lower than the average of the inner diameter of the cylinder and the bottom diameter of the screw groove, the shearing action of the scraping flights is not more than $\frac{1}{10}$ of the shearing action of the scraping flights of normal height.

To be more specific, inverse flights are locally formed at the end portions of the two screws in the discharging section, and the height of the inverse flights is an average of the inner diameter of the cylinder at the discharging section and the bottom diameter of the screw groove at the most. Due to the foregoing arrangement, the melted resin does not stay at the end portion of the discharging section but it is pushed to the discharging port so that the melted resin can easily flow. Therefore, the shearing action caused by the inverse flights becomes negligibly small.

To be more specific, concerning the scraping flights and the inverse flights, the height of the flights of the screw distant from the discharging port is smaller than the height of the flights of the screw close to the discharging port. Due to the foregoing arrangement, a difference of the shearing action caused by a difference of the facing distance between the inner hole of the cylinder and the screw flights can be made uniform. That is, the smaller the gap between the inner hole of the cylinder and the screw flights is, the more the shearing action is increased, and the longer the facing distance is, the more the shearing action is increased. Consequently, when the height of the flights of the screw distant from the discharging port, in which the facing distance is long, is made to be smaller than the height of the flights of the screw close to the discharging port, in which the facing distance is short, the shearing action can be made more-uniform.

To be more specific, the inner surface shape of the section of the cylinder at the discharging section of the screw type two-shaft kneader in a direction perpendicular to the axis of the cylinder is formed into a laid U-shape which is open to the discharging port containing the two screws. Due to the foregoing arrangement, a protrusion formed at the connecting portion of the two circles of the inner hole can be eliminated. Accordingly, there is no fluid resistance, and the melted resin material does not stay in the inner hole. Therefore, the melted resin material can easily flow to the discharging port.

BRIEF DESCRIPTION OF THE DRAWINGS

FIG. 1 is a cross-sectional view taken on line I—I in FIG. 2;

FIG. 8 is a longitudinal cross-sectional view taken in the axial direction showing a conventional example, that is, FIG. 8 is a cross-sectional view taken on line VIII—VIII in FIG. 9.

DETAILED DESCRIPTION OF THE PREFERRED EMBODIMENTS

Referring to the accompanying drawings, the preferred embodiments of the kneading and extruding machine of the present invention will be explained in detail as follows. In these explanations, like reference characters designate the same or similar parts throughout the drawings of the conventional example and the drawings of the embodiments of the present invention.

Figure 1:
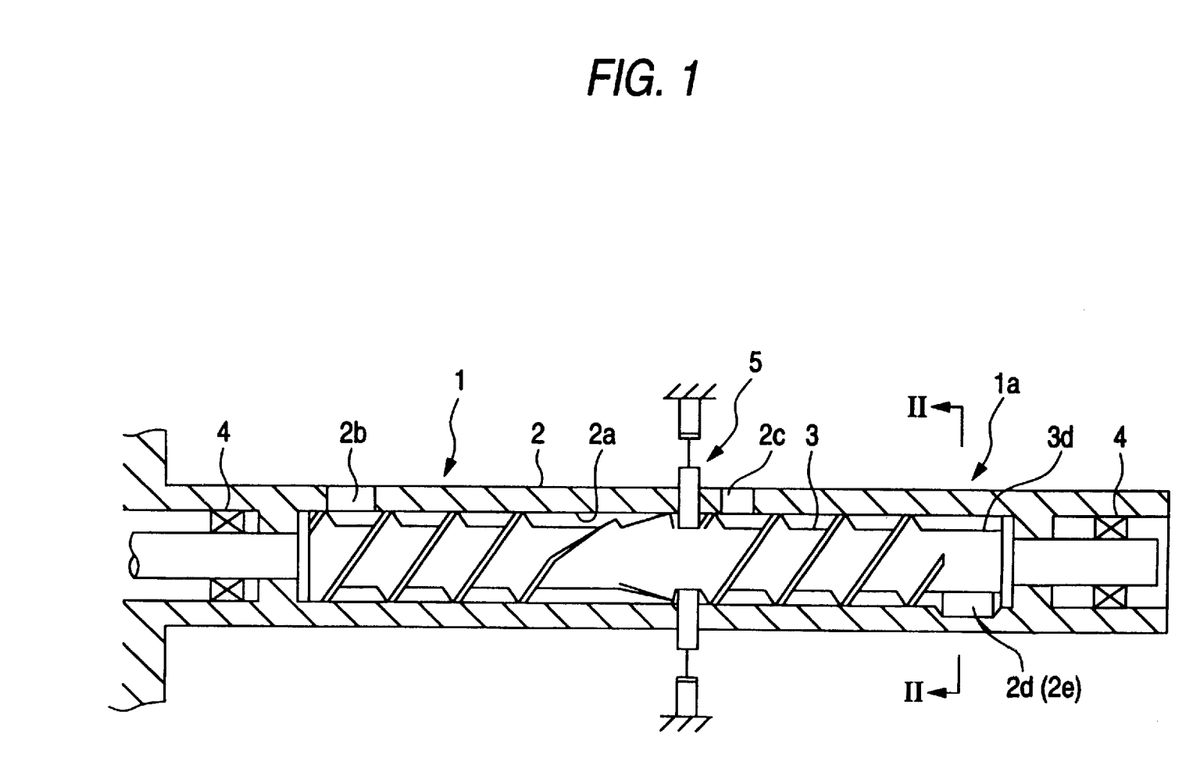
FIG. 1 is a longitudinal cross-sectional view taken in the axial direction showing the first embodiment of the present invention, that is.
Figure 2:
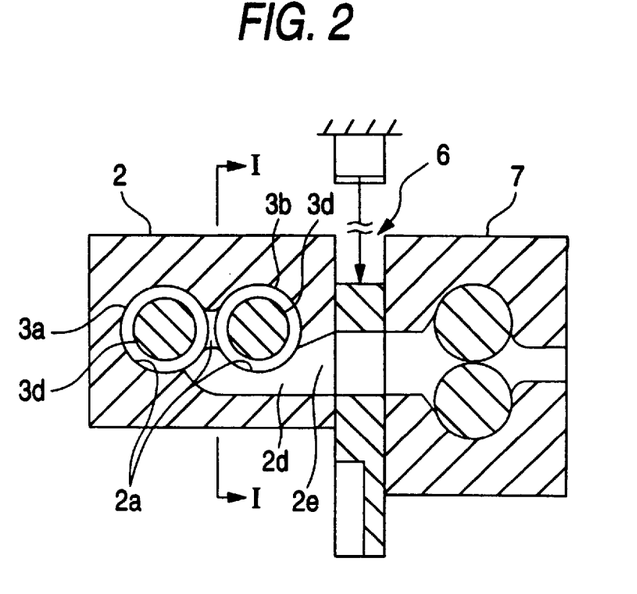
FIG. 2 is a cross-sectional view taken on line II—II in FIG. 1.

FIGS. 1 and 2 are views showing the first embodiment of the present invention. Reference numeral 1 is a screw type two-shaft kneader. The screw type two-shaft kneader 1 includes a cylinder 2 horizontally arranged, and two screws 3 rotatably inserted into an inner hole 2a formed in the cylinder 2. In the cylinder 2, there are formed a supply port 2b on an upper surface at the rear end portion of the inner hole 2a, a vent hole 2c on an upper surface of the middle portion, and a discharge port 2e arranged on one side of the end portion. The section of the inner hole 2a perpendicular to its axis is formed into two circles arranged horizontally. The two circles are adjacent and communicated with each other at the adjoining portion. At the end portion of the inner hole 2a, there is formed a discharging passage 2d from the adjoining portion to the discharge port 2e along the lower side of the inner hole 2a. The two screw shafts 3 are rotatably supported by bearings 4 arranged at the front and the rear end portion of the inner hole 2a. In the two screw shafts 3, there are provided flights by which resin material is successively conveyed, kneaded, deaerated and measured from the rear to the front end portion of the inner hole 2a. In this case, the discharging section 1a at the end of the screws is formed into a columnar-shape 3d having no flights. In this embodiment, the columnar-shape 3d is the same as the shape of a groove bottom portion of the screw 3 immediately before the discharging section 1a, however, the diameter of the columnar-shape 3d may be smaller than the diameter of the groove bottom portion. In this embodiment, between the kneading section and the deaerating section, there is provided a gate type kneading degree adjusting device 5 for adjusting a clearance between the inner hole 2a of the cylinder 2 and the groove bottom of the screw 3, that is, for adjusting a sectional area of the flow passage of resin material. The discharge port 2e is connected with the gear pump 7 via a diverter valve 6.

The above kneading and extruding machine operates as follows. Resin material is supplied from the supply port 2b into the screw type two-shaft kneader 1. While the supplied resin material is being heated by a heating unit (not shown) via the cylinder 2 and melted and kneaded by the shearing action of the screw 3, the rear end portion of which is rotated by a drive unit (not shown), the resin material flows toward the discharging section 1a. The flowing direction is changed by an angle of 90° in the discharging section 1a. Then the resin material is discharged from the discharging port 2e to the gear pump 7 via the diverter valve 6. After that, the pressure of the resin material is increased by the gear pump 7, and the resin material is extruded from the gear pump 7. During the above operation, the degree of kneading the resin material is adjusted by the kneading degree adjusting device 5, and volatile components and water are removed from the resin material via the vent hole 2c. In the initial stage of operation, or in a change in resin material, the resin material that contains mixtures is discharged to the outside of the apparatus by the action of the diverter valve 6. In the steady operation, the resin material discharged from the discharging port 2e is supplied to the gear pump 7 when the diverter valve 6 is changed over.

In this embodiment, the two screws 3a, 3b are formed into columnar-shapes having no flights in the discharging section 1a of the screw type two-shaft kneader 1. Consequently, the melted resin material that has flowed into the discharging section 1a is subjected to a negligibly low intensity of shearing action by the rotation of the column. Accordingly, the resin material, which has been kneaded by the two screws 3a, 3b under the same condition, is discharged from the discharging port 2e by the conveyance action of the screws 3 located in the upstream of the discharging section 1a without causing a difference in the degree of kneading.

Figure 3:
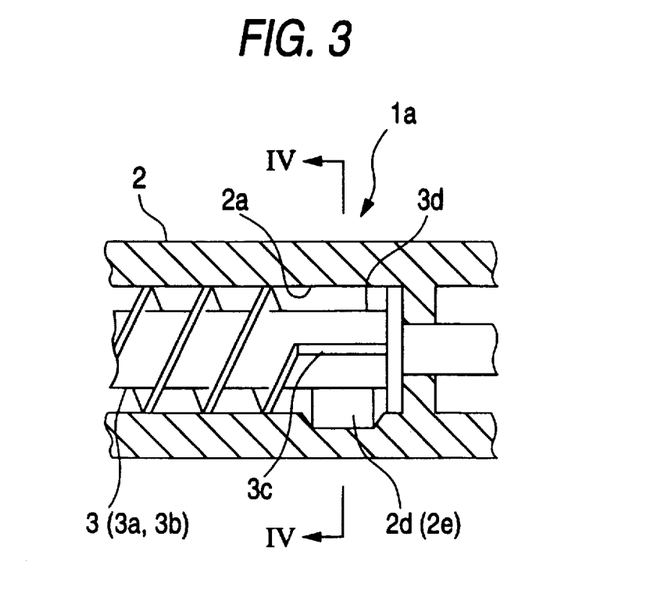
FIG. 3 is a longitudinal cross-sectional view taken in the axial direction showing a primary portion of the second embodiment of the present invention.
Figure 4:
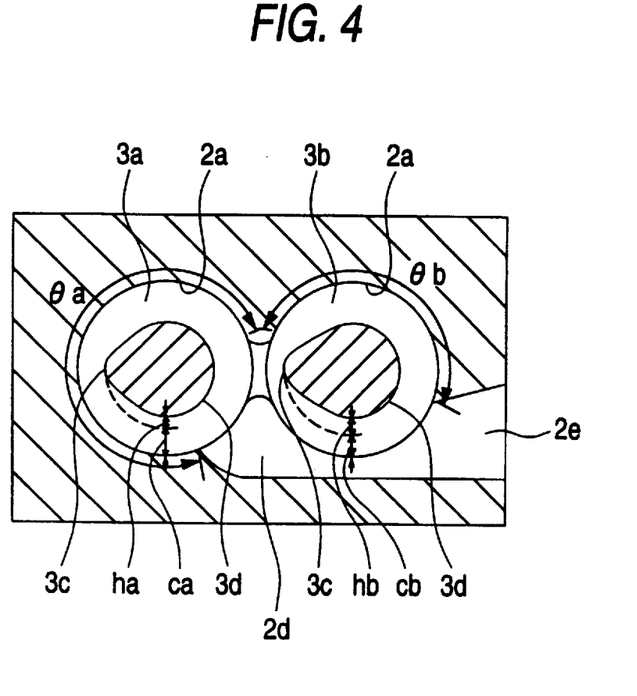
FIG. 4 is a cross-sectional view taken on line IV—IV in FIG. 3.

FIGS. 3 and 4 are views showing the second embodiment of the present invention. In this embodiment, one series of scraping flight 3c is formed in each of the two screw shafts 3a, 3b in the discharging section 1a. The height of the scraping flight 3c extends no more than halfway between the groove bottom 3d and the inner hole 2a. Further, the height ha of the flight of the screw 3a distant from the discharging port 2e is lower than the height hb of the flight of the screw 3b close to the discharging port 2e. When gaps between the top portions of the scraping flights 3c of the two screws 3a, 3b and the inner hole 2a are respectively defined as ca and cb, the inequalities ha $\leq$ ca, hb $\leq$ cb and ha $\leq$ hb are established.

In the discharging section 1a of the above screw type two-shaft kneader 1 of this embodiment, the scraping flight 3c discharges resin material more effectively than the scraping flight in the first embodiment. Concerning the shearing action, the larger the gap between the flight and the inner hole 2a is, the lower the shearing action is reduced. Since the scraping flight 3c is one series of flight, the height of which is [no more] than the average value of the inner hole 2a and the bottom diameter of the screw 3, the shearing action caused by the flight is reduced to about 1/20 of the shearing action caused by two series of flights, the height of which is normal (the gap is small). Accordingly, only a negligibly small shearing force acts on the resin material. When a rotational angle is $\theta a$ at which the flight of the screw 3a distant from the discharging port 2e faces the inner hole 2a, and also when a rotational angle is $\theta b$ at which the flight of the screw 3b close to the discharging port 2e faces the inner hole 2a, the inequality $\theta b < \theta a$ is established. Further, when ha<hb, a difference in the shearing action, which is small, caused by a difference in the distances (rotational angles) in which the two screws 1a, 3b act can be made more uniform.

Figure 5:
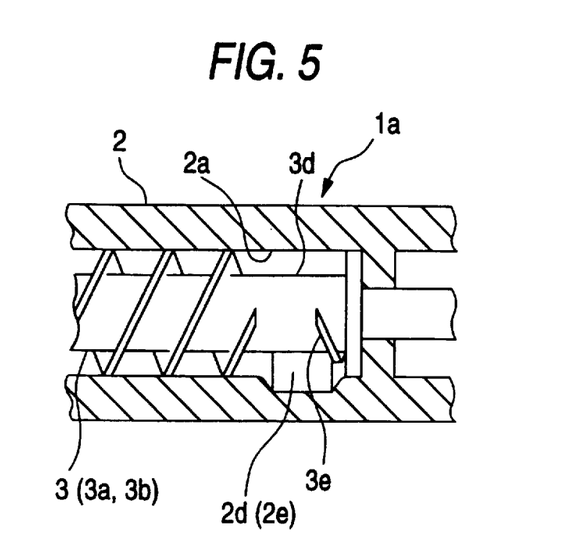
FIG. 5 is a longitudinal cross-sectional view taken in the axial direction showing a primary portion of the third embodiment of the present invention.

FIG. 5 is a view showing the third embodiment of the present invention. This embodiment is arranged in such a manner that an inverse flight 3e is locally attached to the end portion of the screw 3 in the discharging section 1a in the first embodiment. In this embodiment, relations among the inner hole 2a of the cylinder 2, the bottom diameter 3d of the groove of the screw 2 and the height of the inverse flight 3e are the same those of the second embodiment.

In the discharging section 1a of the above screw type two-shaft kneader 1, the melted resin material is pushed by the conveyance action of the screw 3 in the axial direction so that the melted resin material can not stay at the end portion of the discharging section. Accordingly, the melted resin material easily flows to the discharging port. In this embodiment, a gap formed between the top portion of the inverse flight 3e and the inner hole 2a is large. Therefore, only a negligibly small intensity of shearing force acts on the melted resin material in the same manner as that of the second embodiment.

Figure 6:
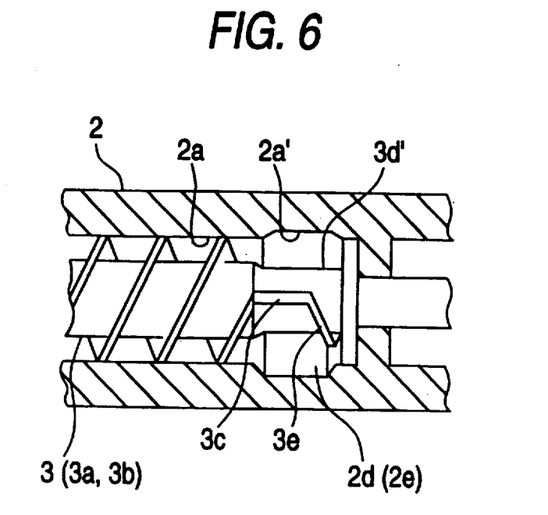
FIG. 6 is a longitudinal cross-sectional view taken in the axial direction showing a primary portion of the fourth embodiment of the present invention.

FIG. 6 is a view showing the fourth embodiment of the present invention. In this embodiment, the second and the third embodiment are combined. In the screw 3 at the discharging section 1a, there are provided a scraping flight 3c and an inverse flight 3e arranged at the front end portion. In this connection, the height of each flight is the same as those of the second and the third embodiment.

In the discharging section 1a of the above screw type two-shaft kneader 1, the scraping action is conducted by the scraping flight 3c, and the pushing action is conducted by the inverse flight 3e. Due to the foregoing, the melted resin material can be more effectively discharged. In the same manner as that of the embodiment described before, the shearing action is very small, so that the melted resin material of a uniform degree of kneading can be discharged.

In this connection, the diameter of the inner hole 2a' of the discharging section 1a is larger than the diameter of the inner hole 3a immediately before the discharging section 1a. Also, the bottom diameter 3d' of the groove of the screw 3 is smaller than the bottom diameter 3d of the groove immediately before the discharging section 1a. When a gap between the inner hole 2a and the bottom diameter 3d of the groove is small, the shearing action of the flights 3c, 3e, the height of which is reduced, can not be neglected. For this reason, when both the inner hole 2a and the bottom diameter 3d of the groove, or either the inner hole 2a or the bottom diameter 3d of the groove is changed immediately before the discharging section 1a so as to increase the gap, the shearing actions of the flights 3c, 3e can be reduced. The above can be applied to the first, the second and the third embodiment described before.

Figure 7:
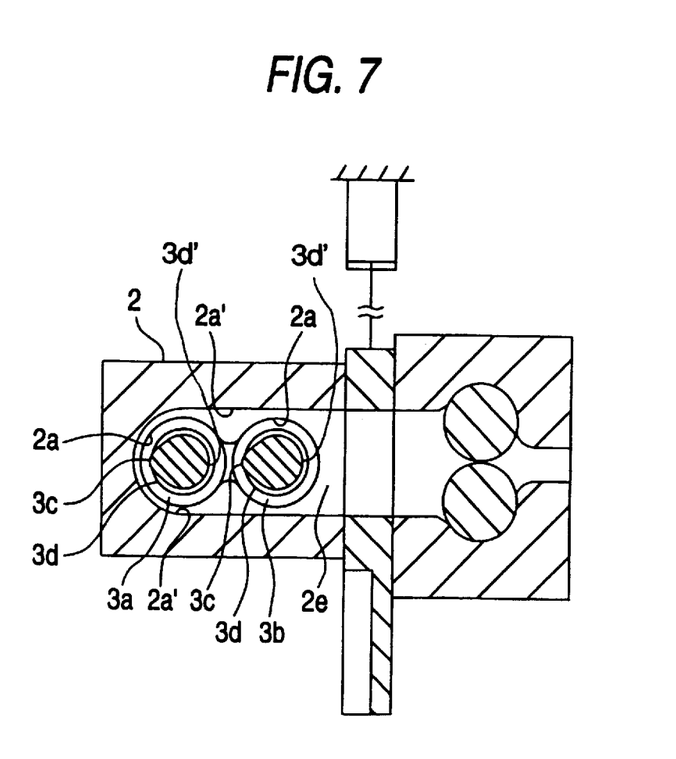
FIG. 7 is a longitudinal cross-sectional view taken in the axial direction showing a primary portion of the fifth embodiment of the present invention.

FIG. 7 is a view showing the fifth embodiment of the present invention. In this embodiment, the section of the inner hole 2a of the cylinder 2 at the discharging section 1a in a direction perpendicular to the axis of the cylinder 2 is formed into a laid U-shape which is open to the discharging port 2e in the fourth embodiment. In FIG. 7, the shape of the screw 3 in the discharging section 1a is the same as the shape of one series of scraping flight 3c shown in the second embodiment. However, it is possible to apply the shapes of scraping flights shown in the first, the third and the fourth embodiment in the same manner. In the discharging section 1a of the above screw type two-shaft kneader 1, the upper and lower protrusions formed at the joining portion of the two circles of the inner hole 2a are eliminated. Accordingly, there is no possibility of the occurrence of fluid resistance caused by the protrusions. Therefore, the melted resin material easily flows to the discharging port 2e.

In each embodiment described above, resin material is uniformly melted and kneaded by the two screws 3a, 3b in the upstream and flows into the discharging section 1a. In the discharging section 1a, the melted resin material is seldom subjected to a shearing action. Accordingly, the resin material can be discharged in a uniform kneading condition, that is, the resin material can be discharged at a uniform temperature.

Concerning the scraping flight 3c and the inverse flight 3e formed in the screw 3 corresponding to the discharging section 1a, not less than 2 series of flights may be provided. However, the larger the number of series of flights is, the higher the shearing force is increased. For this reason, the number of series of flights is preferably one.

In the above embodiments, no differences are caused in the rotational directions of the two screws 3a, 3b. In the present invention, the two screws 3a, 3b may be rotated in the same direction or different directions.

The present invention arranged as described above can provide the following effects.

(1) The screw of the screw type two-shaft kneader in the discharging section is formed into a columnar-shape having no flights. Accordingly, a shearing action is seldom conducted on the melted resin material in the discharging section. Therefore, the melted resin material that has flowed into the discharging section in a uniform kneading condition can be discharged from the discharging section while the uniform kneading condition is maintained.

(2) There is provided a scraping flight in the screw at the discharging section of the screw type two-shaft kneader. Due to the foregoing, the discharging action of the melted resin material can be forcibly conducted. Since the outer diameter of the flight is not more than the average of the inner diameter of the cylinder and the bottom diameter of the screw groove, only a negligibly small intensity of shearing action acts on the melted resin material. Accordingly, the melted resin material flows to the discharge port in an approximately uniform kneading condition and discharged.

(3) There is provided an inverse flight at the front end of the screw at the discharging section of the screw type two-shaft kneader. Accordingly, the melted resin material does not stay at the front end portion of the discharging section but it is pushed and flows to the discharge port. Since the outer diameter of the flight is not more than the average of the inner diameter of the cylinder and the bottom diameter of the screw groove, only a negligibly small intensity of shearing action is conducted on the melted resin material. Therefore, the melted resin material is discharged in an approximately uniform kneading condition.

(4) Concerning the scraping flight and the inverse flight at the discharging section of the screw type two-shaft kneader, the outer diameter of the flight of the screw distant from the discharging port is smaller than the outer diameter of the flight of the screw close to the discharging port. Accordingly, no differences in the shearing action are caused between the melted resin material that has flowed into the discharging section from the screw distant from the discharging port and the melted resin material that has flowed into the discharging section from the screw close to the discharging port. Therefore, the melted resin material reaches the discharging port in an approximately uniform kneading condition and discharges from the discharging port.

(5) The section of the inner hole of the cylinder at the discharging section of the screw type two-shaft kneader in a direction perpendicular to the axis of the cylinder is formed into a laid U-shape which is open to the discharging port containing the two screws. Accordingly, the melted resin material does not stay but easily reaches the discharging port and discharges from the discharging port.

That is, according to the kneading and extruding machine of the present invention, melted resin material of a uniform kneading degree, that is, melted resin material of a uniform melting temperature is extruded from the discharging port.

What is claimed is:

1. A kneading and extruding machine, comprising:

a screw type two-shaft kneader including a cylinder, two screws rotatable inserted in parallel with each other into inner holes of the cylinder in a horizontal condition, and a gear pump connected with a discharging port arranged on the side of a discharging section of the cylinder, wherein column portions of the two screw shafts positioned in the discharging section are formed into columnar shapes, respectively, and wherein the column portions are the same as shapes of groove bottoms of the two screws immediately before the discharging section, respectively.

2. The kneading and extruding machine of claim 1, wherein diameters of the inner holes of the discharging section are larger than diameters of the inner holes immediately before the discharging section, respectively, and wherein diameters of groove bottoms of the two screws are smaller than diameters of groove bottoms immediately before the discharging section, respectively.

3. A kneading and extruding machine, comprising:

a screw type two-shaft kneader including a cylinder, two screws rotatably inserted in parallel with each other into inner holes of the cylinder in a horizontal condition, and a gear pump connected with a discharging port arranged on the side of a discharging section of the cylinder, wherein column portions of the two screw shafts positioned in the discharging section are formed into columnar shapes, respectively, and wherein the column portions have no flights, respectively.

4. A kneading and extruding machine, comprising:

a screw type two-shaft kneader including a cylinder, two screws rotatably inserted in parallel with each other into inner holes of the cylinder in a horizontal condition, and a gear pump connected with a discharging port arranged on the side of a discharging section of the cylinder, wherein column portions of the two screw shafts positioned in the discharging section are formed into columnar shapes, respectively, and wherein inverse flights are partially formed respectively on the column portions, and heights of the inverse flights are averages of inner diameters of the inner holes of the cylinder at the discharging section and diameters of groove bottoms of the screws at the most, respectfully.

5. A kneading and extruding machine, comprising:

a screw type two-shaft kneader including a cylinder, two screws rotatably inserted in parallel with each other into inner holes of the cylinder in a horizontal condition, and a gear pump connected with a discharging port arranged on the side of a discharging section of the cylinder, wherein portions of the two screws positioned in the discharging section are respectfully provided with scraping flights, and heights of the scraping flights are averages of inner diameters of the inner holes of the cylinder at the discharging section and diameters of groove bottoms of the two screws at the most, respectively, and wherein the height (ha) of the scraping flight of the first screw distant from the discharging port is lower than the height (hb) of the scraping flight of the second screw close to the discharging port.

6. The kneading and extruding machine of claim 5, wherein when gaps between top portions of the scraping flights of the first and second screws and the inner holes are respectively defined as (ca) and (cb), following inequalities:

$ha \leq ca$, $hb \leq cb$ and $ha \leq hb$ are established.

7. A kneading and extruding machine, comprising:

a screw type two-shaft kneader including a cylinder, two screws rotatably inserted in parallel with each other into inner holes of the cylinder in a horizontal condition, and a gear pump connected with a discharging port arranged on the side of a discharging section of the cylinder, wherein portions of the two screws positioned in the discharging section are respectfully provided with scraping flights, and heights of the scraping flights are averages of inner diameters of the inner holes of the cylinder at the discharging section and diameters of groove bottoms of the two screws at the most, respectively, and wherein inverse flights are partially formed respectively on the portions of the two screws positioned in the discharging section, and heights of the inverse flights are averages of inner diameters of the inner holes of the cylinder at the discharging section and diameters of the groove bottoms of the two screws at the most, respectively.

8. The kneading and extruding machine of claim 7, wherein the heights of the scraping flights and the heights of the inverse flights of the two screws distant from the discharging port are smaller than the height of the scraping flights and the height of the inverse flights of the two screw close to the discharging port, respectively.

* * * * *